(12) United States Patent
Shrive et al.

(10) Patent No.: US 7,201,245 B2
(45) Date of Patent: Apr. 10, 2007

(54) CONTROL FOR A HYDROSTATIC POWER TRAIN

(75) Inventors: Chris Shrive, Dunfermline (GB); Graham Perry, Edinburgh (GB); Heinz-Gerhard Essig, Lonsee (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 0 days.

(21) Appl. No.: 10/531,640

(22) PCT Filed: Oct. 2, 2003

(86) PCT No.: PCT/EP03/10986

§ 371 (c)(1),
(2), (4) Date: Oct. 11, 2005

(87) PCT Pub. No.: WO2004/036093

PCT Pub. Date: Apr. 29, 2004

(65) Prior Publication Data

US 2006/0054376 A1   Mar. 16, 2006

(30) Foreign Application Priority Data

Oct. 15, 2002   (DE) ................. 102 48 028

(51) Int. Cl.
*B60K 28/16*   (2006.01)
(52) U.S. Cl. ............................... 180/197; 56/11.1
(58) Field of Classification Search ............ 180/197, 180/20, 305, 306, 307, 6.48, 6.32; 56/10.8, 56/10.9, 11.1
See application file for complete search history.

(56) References Cited

U.S. PATENT DOCUMENTS 3,917,014 A * 11/1975 Ward ..................... 180/6.48
4,116,294 A *  9/1978 Johnston ................ 180/242

(Continued)

FOREIGN PATENT DOCUMENTS

| DE | 196 38 421 A1 | 3/1997 |
| DE | 101 01 748 A1 | 8/2002 |
| EP | 0 226 844 A1 | 7/1987 |
| EP | 1 079 153 A2 | 8/2000 |
| EP | 1 223 069 A2 | 11/2001 |

*Primary Examiner*—Tony Winner
(74) *Attorney, Agent, or Firm*—Scully, Scott, Murphy & Presser, P.C.

(57) ABSTRACT

A hydrostatic power train includes a hydraulic pump, which is connected, via a first main pipe and a second main pipe, to a first hydromotor unit driving a front axle and to a second hydromotor unit driving a rear axle. The first and second hydromotor units can be adjusted in terms of their displacement via a first and second variation device. A direction of travel is defined as forward movement (F) or reverse movement (R) by a position of an operating lever. The first and the second variation devices are controlled by a control valve which takes up a first control position upon a forward movement (F) determined by the position of the operating ever and which takes up a second control position upon reverse movement (R) determined by the position of the operating lever and which takes up a second control position upon reverse movement (R) determined by the operating lever. In the first control position, the first variation device is controlled such that the first motor unit is adjusted for a smaller displacement and, in the second control position; the second variation device is controlled such that the second motor unit is adjusted for a smaller displacement.

24 Claims, 7 Drawing Sheets

U.S. PATENT DOCUMENTS 4,399,886 A * 8/1983 Pollman .................... 180/197
4,976,332 A 12/1990 Hein
5,924,509 A * 7/1999 Ferguson et al. ........... 180/197
6,062,332 A * 5/2000 Stephenson et al. ........ 180/305

* cited by examiner

CONTROL FOR A HYDROSTATIC POWER TRAIN

BACKGROUND OF THE INVENTION

1. Field of the Invention

The invention concerns a controller for a hydrostatic traversing mechanism.

Hydrostatic traversing mechanisms, in which two hydraulic motors are connected to a hydraulic pump and the hydraulic pump is driven by a driving motor, are known as traversing mechanisms of working machines such as road rollers. In such a system, in which one hydraulic motor each is assigned to the front and rear axles, to adapt the torque distribution of the individual motors to the conditions of use, e.g. uphill and downhill, various systems for traction control are known.

2. Discussion of the Prior Art

In DE 101 01 748 A1, for instance, a system in which signals from pressure sensors, which are arranged in the pressure-side and induction-side main duct, are fed to an electronic control unit, is proposed. On the basis of changes of the pressure signals and changes of the position of a driving lever, the electronic control unit determines the present driving situation of the vehicle. For this purpose, a threshold value which is corrected depending on changes of the position of the driving lever is used, so that different driving situations can be clearly distinguished from each other. If one of the pressure sensors determines a pressure value which exceeds the corrected threshold value, the driving situation which the electronic control unit determines is used to send an electrical signal for adjustment towards a lower absorption volume to an adjustment device of the up-side hydraulic motor.

The system which is proposed in DE 101 01 748 A1 has the disadvantage that the cost of construction is relatively great. Thus not only are pressure sensors required in both main ducts, but also an electronic controller, which is capable of storing changes of the position of the driving lever at least for a short time, so that it can not only evaluate an instantaneous actual value, but also include the change of the driving lever position in the determination of the driving situation.

Also, from DE 196 38 421 A1 a traction controller, in which a gradient sensor is used to prevent an unwanted adjustment of a down-side hydraulic motor in the direction of smaller pivoting angles, is known. The system is based on a traction controller, which detects differing wheel circumference speeds on the front and rear axles on the basis of r.p.m. sensors, and by adjusting the absorption volume adjusts the r.p.m. of the corresponding hydraulic motor. In this case the situation which can occur is that the wheel circumference speed of the down-side axle during downhill motion is less than the wheel circumference speed of the up-side axle, because of the slip which occurs. Because of the regulating intervention of the traction controller, this would result in an adjustment of the down-side hydraulic motor in the direction of a smaller pivoting angle, to raise the r.p.m. of the hydraulic motor, which however causes a reduction of the moment. To maintain the braking moment during downhill motion, the information of a gradient sensor is used, to suppress the control commands which the traction controller gives to the adjustment device of the hydraulic motor and thus to prevent the adjustment of the hydraulic motor in the direction of a smaller pivoting angle. The gradient sensor therefore prevents an adjustment of the pivoting angle of the hydraulic motor.

The system which is known from DE 196 38 421 A1 has the disadvantage that the traction controller intervenes only when a slip has already occurred. On the other hand, reduction of the transmitted torque to one of the axles before a slip occurs on one of the axles is not provided.

SUMMARY OF THE INVENTION

The invention is based on the object of creating a controller for a hydrostatic traversing mechanism. With this controller, a preventive adjustment of hydraulic motor units takes place in a simple way, to act against the inclination to form a slip.

In the case of the controller according to the invention for the hydrostatic traversing mechanism, it is advantageous that drive torques are differentially distributed to the front and rear axles of the vehicle on the basis of a simple signal. According to claims 1 and 2, this simple signal is either the direction of motion which is given via the driving lever or the direction of inclination of the vehicle, which is determined by an inclination sensor. Corresponding to the direction of motion or the determined inclination of the vehicle, a control valve, through which, by means of a variation device which is provided on the appropriate hydraulic motor unit, a hydraulic motor unit is adjusted in the direction of smaller absorption volume, is operated. Through the adjustment of the hydraulic motor unit in the direction of smaller absorption volume, the torque which can be transmitted to the corresponding axle is reduced, thus acting against the occurrence of slip.

In the case wherein instead of an electrical signal there is used the sign of the pressure different between a first and second main duct to apply pressure to the variation device of the relevant hydraulic motor unit by means of a control valve unit, in such a way that one of the two hydraulic motor units is adjusted in the direction of a smaller pivoting angle. Use of the sign of the pressure difference between the first and the second main duct has the advantage that for both forward motion and backward motion, the hydraulic motor unit of the axle which is oriented uphill is adjusted in the direction of smaller absorption volume. Because of the pressure reversal in the first and second main ducts during downhill motion, even for a downhill motion the hydraulic motor unit which is oriented uphill is pivoted in the direction of smaller toque, so that for downhill braking too, optimum distribution of moment on the axles is achieved.

Advantageous extensions of the controller according to the invention are presented in the subclaims.

It is particularly advantageous to provide, on the control valve or control valve unit, an additional switching position, in which both the hydraulic motor unit of the front axle and the hydraulic motor unit of the rear axle are adjusted in the direction of smaller absorption volume, to make a higher speed of motion possible, e.g. for transport.

A further advantage is, simultaneously with the adjustment of a hydraulic motor unit in the direction of smaller torque, to adjust the absorption volume of the other hydraulic motor unit oppositely, in the direction of greater absorption volume, so that the sum of the absorption volumes remains constant. For this purpose, a hydraulic motor unit consisting of several hydraulic motors, each of which has a constant absorption volume, can be used specially advantageously. To change the absorption volume of such a hydraulic motor unit, one of the hydraulic motors can then be switched on or off.

According to another advantageous extension, it is provided that the absorption volume of the hydraulic motor units is continuously adjustable. For this purpose, the control valve or control valve unit, as well as the control valves which are provided on each of the variation devices, are in the form of continuously adjustable valves. Thus, particularly if an inclination sensor, which not only determines the existence of a downhill or uphill gradient but also its steepness, is used, a continuous shift of the ratio between the torques on the front axle and rear axle can occur.

BRIEF DESCRIPTION OF THE DRAWINGS

Preferred embodiments of the controller according to the invention for a hydrostatic traversing mechanism are shown in the drawings, and are explained in more detail on the basis of the following description.

DETAILED DESCRIPTION OF THE INVENTION

Figure 1:
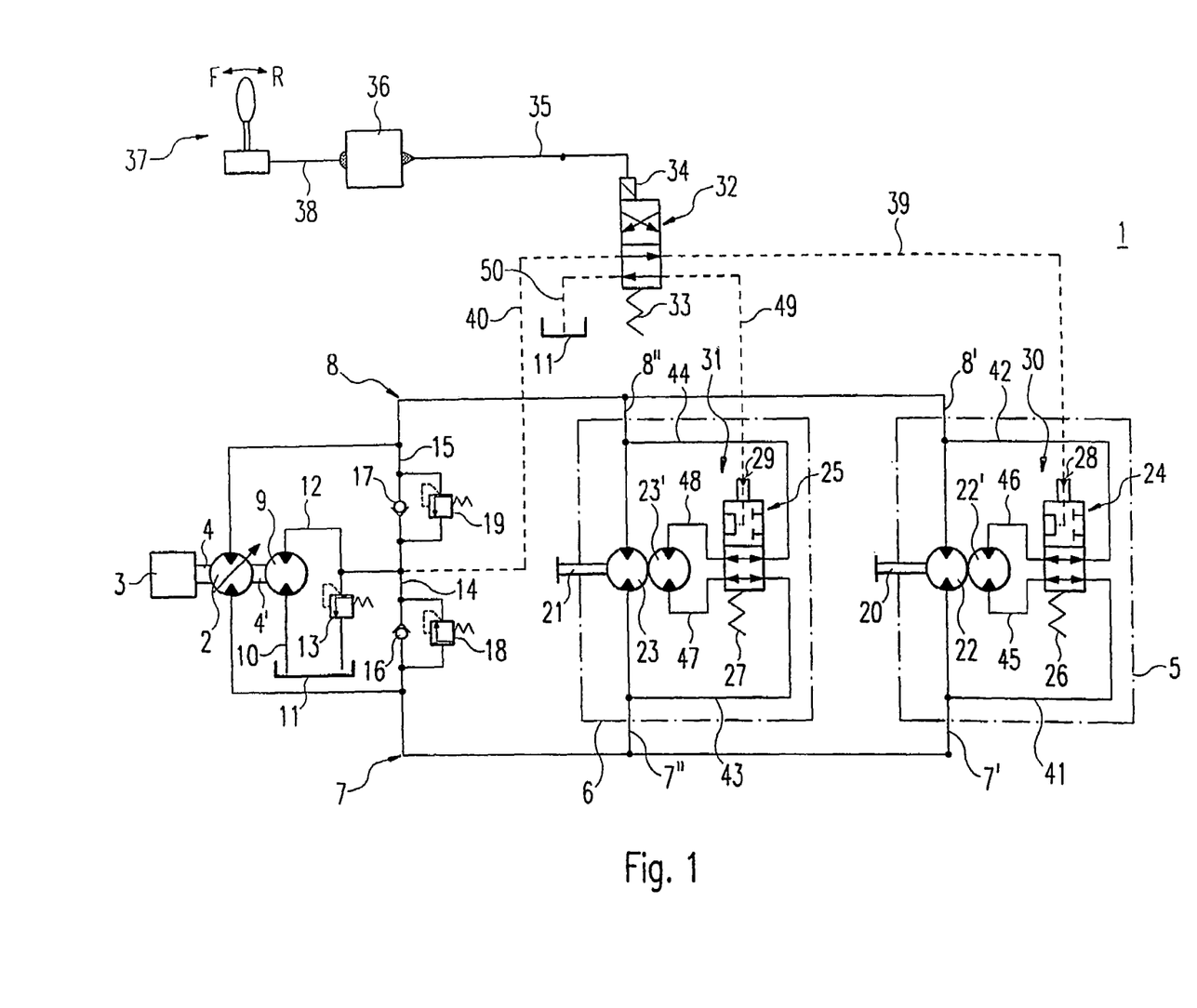
FIG. 1 shows a schematic representation of a hydrostatic traversing mechanism, with a first embodiment of a controller according to the invention.

A first embodiment of a controller according to the invention for a hydrostatic traversing mechanism is shown in FIG. 1. A hydrostatic traversing mechanism 1 includes a pump 2, which is driven by a prime mover 3. The pump 2 is connected via a drive shaft 4 to the prime mover 3. The hydrostatic traversing mechanism also includes a first hydraulic motor unit 5 and a second hydraulic motor unit 6. The first hydraulic motor unit 5 and the second hydraulic motor unit 6 are connected in parallel via a first main duct 7 and a second main duct 8 to the pump 2. Depending on the delivery direction of the pump 2, the hydraulic fluid is fed from the first main duct 7 via a first connecting duct 7' to the first hydraulic motor unit 5, and via a second connecting duct 7" to the second hydraulic motor unit 6, or, in the case of delivery in the opposite direction, from the second main duct 8 via a third connecting duct 8' to the first hydraulic motor unit 5, and via a fourth connecting duct 8" to the second hydraulic motor unit 6.

The pump 2 is adjustable for delivery volume, and suitable for delivery in two directions. The delivery volume is set by an adjustment device (not shown). The adjustment device can be adjusted by signals from an electronic control unit (also not shown). The electronic control unit preferably also acts on the prime mover 3 and adjusts it for power and r.p.m. An auxiliary pump 9 is driven by the prime mover 3 via a section 4' of the drive shaft 4. The auxiliary pump 9 is suitable for delivery in one direction, and its delivery volume is permanently set. On its induction side, the auxiliary pump 9 is connected via an induction duct 10 to a tank volume 11. In a duct 12 which is connected on the pressure side to the auxiliary pump 9, a pressure relief valve 13, which relieves the duct 12 into the tank volume 11 when a maximum pressure which is determined by a spring is exceeded, is provided. The duct 12 is connected via a first feed duct 14 to the first main duct 7, and via a second feed duct 15 to the second main duct 8.

In each of the first and second feed duct 14 and 15, a first non-return valve 16 and second non-return valve 17 which open in the direction of the first main duct 7 and second main duct 8 respectively are arranged. Parallel to the first and second non-return valve 16 and 17 respectively, a maximum pressure relief valve 18 and 19, which relieves the first main duct 7 and second main duct 8 respectively via the duct 12 and pressure relief valve 13 into the tank volume 11 when a maximum permitted pressure for the main ducts 7 and 8 is exceeded, is provided.

The first hydraulic motor unit 5 drives, for instance, a roller which is arranged on the front axle of a road roller, via a first driven shaft 20. A second roller, which is arranged on the rear axle of a road roller, is driven via a second driven shaft 21 by the second hydraulic motor unit 6. The first hydraulic motor unit 5 and second hydraulic motor unit 6 are preferably constructed identically, and each include a first hydraulic motor 22 and 23 respectively and a second hydraulic motor 22' and 23' respectively which is assigned to the first hydraulic motor 22 and 23. The first and second hydraulic motor 22 and 22' of the first hydraulic motor unit 5 and the first and second hydraulic motor 23 and 23' of the second hydraulic motor unit 6 are designed for driving in both directions, and each have a constant absorption volume. The absorption volume of the two first hydraulic motors 22 and 23 is preferably identical. The absorption volume of the two second hydraulic motors 22' and 23' is also preferably identical. On the other hand, the absorption volume of the first hydraulic motor 22 and second hydraulic motor 22', and of the first hydraulic motor 23 and second hydraulic motor 23', can be different.

The second hydraulic motor 22' of the first hydraulic motor unit 5 and the second hydraulic motor 23' of the second hydraulic motor unit 6 are implemented so that they can be switched on and off. To switch the second hydraulic motor 22' and 23' on and off, in each case a control valve 24 and 25 respectively is provided in the first hydraulic motor unit 5 and second hydraulic motor unit 6 respectively. The control valves 24 and 25 are held in an initial position by a control valve spring 26 and 27 respectively. On the control valves 24 and 25, a control surface 28 and 29 respectively, to which a control pressure which steers the control valve 24 and 25 respectively out of its initial position against the force of the control valve spring 26 and 27 respectively is applied, is provided.

If the control valve 24 and 25 is in its initial position, the pressure means which is fed out of the first main duct 7 and second main duct 8 of the respective hydraulic motor unit 5 or 6 is also fed to the second hydraulic motor 22' and 23'. For this purpose, a first linking duct 41, which is connected via the control valve 24 in its initial position to a first joining duct 45 and thus to an input of the second hydraulic motor 22', branches off from the first connecting duct 7'. A second terminal of the first hydraulic motor 22' is connected via a second joining duct 46, the control valve 24 in its initial position, and a second linking duct 42 to the third connecting duct 8'. The second hydraulic motor 23' of the second hydraulic motor unit 6 is similarly connected via a third and fourth joining duct 47 and 48, which in the initial position of the control valve 25 are connected to a third and fourth linking duct 43 and 44 respectively, to the second connecting duct 7″ and fourth connecting duct 8″ respectively.

On the other hand, if the control valve 24 is in the opposite final position, the first and second joining duct 45 and 46 of the second hydraulic motor 22′ of the first hydraulic motor unit 5 are connected to each other. In this switch position of the control valve 24, the second hydraulic motor 22′ is short-circuited, and does not contribute to the generation of a torque on the first driven shaft 20. Correspondingly, the third joining duct 47 and fourth joining duct 48 are connected to each other if the control valve 25 is in the opposite final position. The control valve 24 acts with the hydraulic motor 22′ of the first hydraulic motor unit 5 to form a first variation device 30. The control valve 25 acts with the hydraulic motor 23′ of the second hydraulic motor unit 6 to form a second variation device 31.

To control the first variation device 30 and the second variation device 31, a control valve 32 is provided. The control valve 32 is held by a control valve spring 33 in a first switch position. Against the force of the control valve spring 33, a force can be applied to the control valve 32 by an electromagnet 34. The electromagnet 34 is connected via a signal line 35 to an electronic device 36, which depending on the position of a driving lever 37 applies a switching current to the electromagnet 34. Via another signal line 38, the electronic device 36 receives from the driving lever 37 a signal for whether the position of the driving lever is pointing in the direction of forward driving or backward driving.

In the shown embodiment, the control valve 32 is in the form of a switch valve, which depending on the signal at the electromagnet 34 switches between a first and a second switch position. In the first switch position, in which in the idle state the control valve 32 is, because of the control valve spring 33, the control surface 28 of the control valve 24 of the first hydraulic motor unit 5 is connected via a first control pressure duct 39 to a removal duct 40. The removal duct 40, at the end facing away from the control valve 32, is connected to the duct 12, so that in the first switch position of the control valve 32 the pressure in the duct 12 is applied to the control surface 28 of the control valve 24 of the first hydraulic motor unit 5. The pressure which is generated by the auxiliary pump 9 in the duct 12 is sufficient to overcome the counter-force of the control valve spring 26, so that the control valve 24 is displaced in the direction of the final position opposite the initial position. By displacing the control valve 24 into its final position opposite the initial position, the first and second joining duct 45 and 46 of the second hydraulic motor 22′ are short-circuited, so that, as explained above, the second hydraulic motor 22′ supplies no contribution to the torque on the first driven shaft 20.

Simultaneously, in the first switch position of the control valve 32, the control surface 29 of the control valve 25 of the second hydraulic motor unit 6 is connected via a second control pressure duct 49 to a relief duct 50, which opens into the tank volume 11 on its side facing away from the control valve 32. The control valve 25 of the second hydraulic motor unit 6 is therefore, because of the force of the control valve spring 27, in its initial position. The control valve 25 in its initial position connects a third linking duct 43 to the third joining duct 47 and a fourth linking duct 44 to the fourth joining duct 48. The third and fourth linking duct 43 and 44 are connected via the second connecting duct 7″ and fourth connecting duct 8″ to the first main duct 7 and second main duct 8 respectively, so that the pressure means which the pump 2 conveys into one of the main ducts 7 or 8 is also conveyed to the second hydraulic motor 23′ of the second hydraulic motor unit 6. A torque which is generated by the hydraulic motor 23 and the second hydraulic motor 23′ therefore acts on the driven shaft 21.

If the vehicle, for instance a road roller, moves forwards, the operator has steered the driving lever 37 in the direction of a forward motion F. The steering of the driving lever 37 in the direction of a forward motion F is transmitted via the further signal line 38 of the electronic device 36. In the electronic device 36, a suitable control signal for the electromagnet 34 is generated, or a switched current, which is transmitted via the signal line 35 to the electromagnet 34, is generated directly. In the shown embodiment, because of this signal, no current flows through the electromagnet 34, so that the control valve 32 is held in its first switch position because of the control valve spring 33.

The auxiliary pump 9 is driven by the prime mover 3 via the section 4′ of the drive shaft 4, and generates a pressure which is fed via the removal duct 40 of the control surface 28 of the control valve 24 of the first hydraulic motor unit 5. In the embodiment shown in FIG. 1, the first hydraulic motor unit 5 is assigned to the front axle of the road roller. Depending on the desired driving speed, the pump 2 generates a volume stream which is delivered into the second main duct 8, and is fed via both the third connecting duct 8′ and the fourth connecting duct 8″ to both the first hydraulic motor unit 5 and the second hydraulic motor unit 6. Because of the control pressure which is present on the control surface 28 of the control valve 24 of the first hydraulic motor unit 5, the first joining duct 45 and second joining duct 46 of the second hydraulic motor 22′ of the first hydraulic motor unit 5 are short-circuited, so that on the front axle, via the first driven shaft 20, only the torque which is generated by the first hydraulic motor 22 of the first hydraulic motor unit 5 is present.

On the other hand, in the case of the second hydraulic motor unit 6 which is assigned to the rear axle, a higher torque, which is generated because of the connected second hydraulic motor 23′ and the hydraulic motor 23, acts on the second driven shaft 21. For this purpose, the second hydraulic motor 23′ of the second hydraulic motor unit 6 is connected via the control valve 25, by being connected via the third and fourth linking duct 43 and 44 to the first main duct 7 and second main duct 8 respectively.

Because of this unequal distribution of the torques to the front axle and rear axle of the driven vehicle, during uphill motion the axle which is relieved of load by the inclination of the plane is driven with less moment. If a vehicle moves forwards up a hill, the front axle first tends to slip. This tendency for slip to occur is counteracted by the reduction of the moment on the front axle. The described distribution of the torques to the front axle and rear axle is carried out preventively irrespective of an actually occurring uphill motion, so that even in the case of a forward motion on the level, the torque on the front axle is reduced compared with the torque on the rear axle. The danger of errors in recognising the driving situation is reduced by simply using the direction of motion as the basis. The distribution of the torque in favour of the drive on the rear axle during forward motion also corresponds to the requirements which occur during motion on the level, since during acceleration the rear axle can transmit a higher torque than the front axle.

In a change of direction of motion, the operator moves the driving lever 37 out of the direction for forward motion F into the direction for backward motion R. The change of direction of motion signal is in turn converted by the electronic device 36 into a suitable signal for the electromagnet and transmitted via the signal line 35 to the electromagnet 34. Corresponding to the signal which is now present on the electromagnet 34, current flows through the electromagnet 34 and switches the control valve 32 into its second switch position. In the second switch position, the removal duct 40 is connected to the second control pressure duct 49, so that the pressure which the auxiliary pump 9 generates is present on the control surface 29 of the control valve 25 of the second hydraulic motor unit 6. Correspondingly, the first control pressure duct 39 is now connected to the load relief duct 50. In this way, the control surface 28 of the control valve 24 of the first hydraulic motor unit 5 is relieved of pressure by the connection to the tank volume 11, so that the control valve 24 returns to its initial position because of the control valve spring 26.

In the second switch position of the control valve 32, the second hydraulic motor 23' is consequently switched off, by the third joining duct 47 being short-circuited to the fourth joining duct 48 by the control valve 25. On the other hand, the second hydraulic motor 22' of the first hydraulic motor unit 5 is connected via the first linking duct 41 and second linking duct 42 to the first main duct 7 and second main duct 8 respectively, and thus supplies a contribution to the torque which is available on the first driven shaft 20. Therefore, if the driving lever 37 is steered in the direction of a backward motion, a smaller torque is generated on the rear axle than on the front axle. In this way, in each case a smaller torque is generated on the front axle seen in the direction of motion.

The total absorption volume remains constant in each case, because when the second hydraulic motor 22' of the first hydraulic motor unit 5 is switched on, correspondingly the second hydraulic motor 23' of the second hydraulic motor unit 6 is switched off, and vice versa. By this compensation of the change of the absorption volume on the first or second hydraulic motor unit 5 or 6, control of the delivery volume of the pump 2 is simplified.

Figure 2:
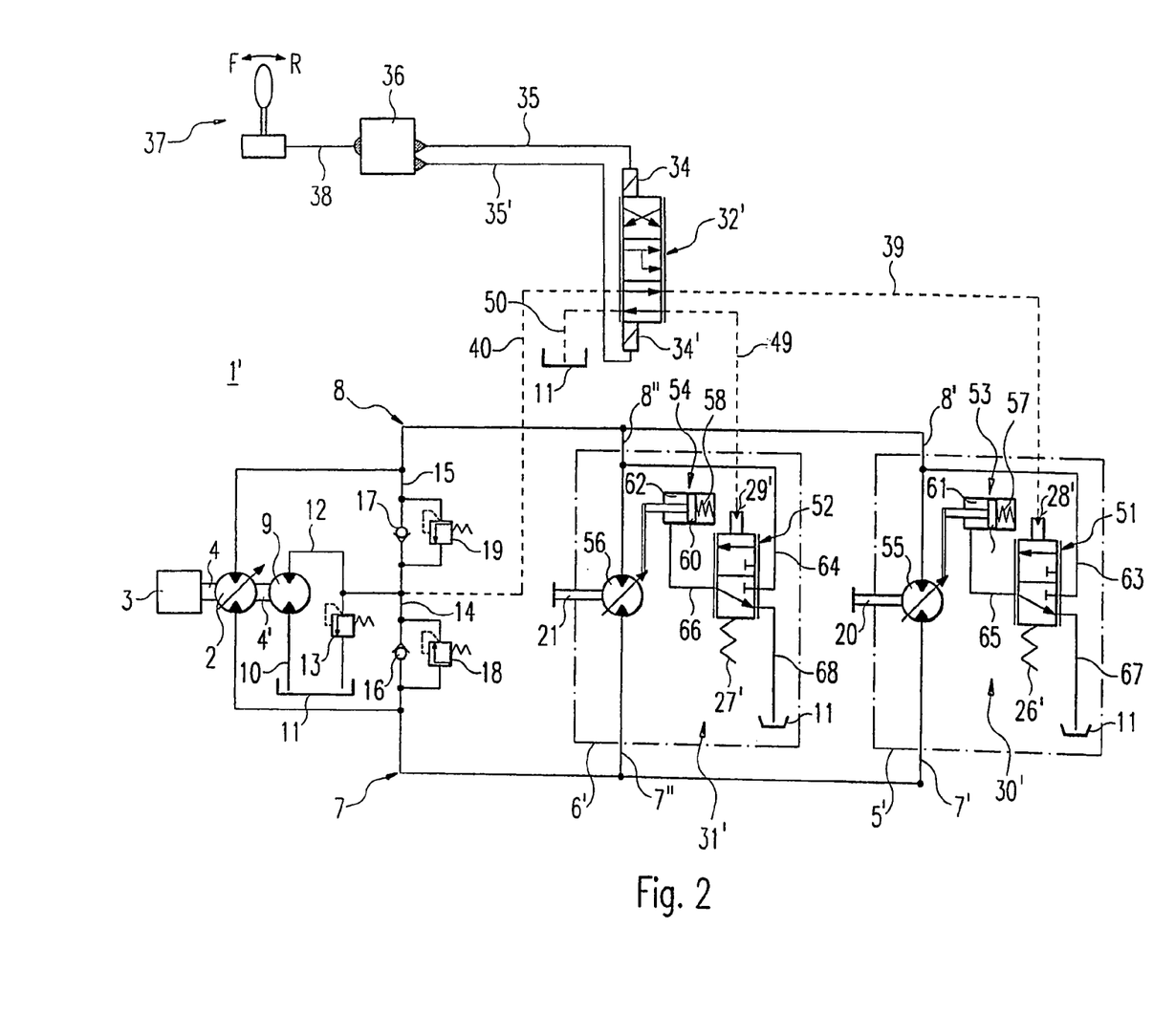
FIG. 2 shows a schematic representation of a hydrostatic traversing mechanism, with a second embodiment of a controller according to the invention.

In FIG. 2, a second embodiment of a controller according to the invention is shown. Identical components are given identical reference symbols. To avoid repetitions, reference is made to the description of FIG. 1.

In contrast to the first embodiment of FIG. 1, in the hydrostatic traversing mechanism according to FIG. 2 a first hydraulic motor unit 5' and a second hydraulic motor unit 6', which have a first hydraulic motor 55 and a second hydraulic motor 56 respectively, are provided. The absorption volume of the first and second hydraulic motor 55 and 56 is adjustable. For instance, machines in swash plate construction, in which the absorption volume is adjusted by adjusting the pivoting angle of the swash plate, can be used.

To adjust the absorption volume of the first hydraulic motor 55 or second hydraulic motor 56, a control valve 32', which can take a first and a second switch position which are identical to the first and second switch position of the control valve 32 from FIG. 1, is provided. Additionally, the control valve 32' can take a third switch position, and is continuously adjustable. The control valve 32' is controlled via the electromagnet 34, and in the opposite direction by a further electromagnet 34'. The further electromagnet 34' is controlled by an additional signal line 35' from the electronic device 36. If, because the driving lever 37 is steered in the direction of forward motion F, a corresponding signal is transmitted via the further signal line 38 to the electronic device 36, in the shown embodiment current is supplied to the further electromagnet 34' by means of the additional signal line 35', and the control valve 32' is in its first switch position.

In the first switch position, the removal duct 40 is connected to the first control pressure duct 39. On the other hand, the second control pressure duct 49 is relieved via the relief duct 50 into the tank volume 11.

The first hydraulic motor unit 5' and the second hydraulic motor unit 6' are constructed identically. The first hydraulic motor unit 5' has, as well as the adjustable first hydraulic motor 55, which drives the first driven shaft 20, a variation device 30'. The variation device 30' consists essentially of a set pressure regulating valve 51 as the control valve, and an adjustment device 53. The adjustment device 53 acts on an adjustment mechanism of the first hydraulic motor 55, and adjusts its absorption volume. The adjustment device 53 includes a pretensioning spring 57, which applies a force to a set piston 59, and adjusts the first hydraulic motor 55 in the direction of maximum absorption volume. Oppositely to the pretensioning spring 57, in a set pressure chamber 61 a hydraulic force acts on the set piston 59. The magnitude of the hydraulic force on the set piston 59 can be adjusted by changing the pressure in the set pressure chamber 61 via the set pressure regulating valve 51.

For this purpose, the set pressure regulating valve 51 can be continuously adjusted between a first and a second final position. It is pressed by a set pressure regulating valve spring 26' in the direction of its first final position. In this first final position of the set pressure regulating valve 51, the set pressure chamber 61 is connected via a set pressure joining duct 65 to a tank duct 67, which relieves the set pressure chamber 61 into the tank volume 11.

Oppositely to the force of the set pressure regulating valve spring 26', a hydraulic force acts on the set pressure regulating valve 51 on the control surface 28' if a pressure is fed via the first control pressure duct 39.

In the first switch position of the control valve 32', the control surface 28' is pressed by the auxiliary pump 9 via the first control pressure duct 39, which is connected to the removal duct 40. The set pressure regulating valve 51 is adjusted in the direction of its second final position, in which a set pressure duct 63 is connected to the set pressure joining duct 65. The set pressure joining duct 63 is connected to the third connecting duct 8', so that in this final position the set pressure chamber 61 is pressed with the pressure of the second main duct 8. The increasing pressure in the set pressure chamber 61 moves the set piston 59 against the force of the pretensioning spring 57, and thus adjusts the first hydraulic motor 55 in the direction of a smaller pivoting angle.

Simultaneously, the second control pressure duct 49 is connected to the relief duct 50 by the control valve 32', so that the pressure which is applied to the control surface 29' is relieved into the tank volume 11. The set pressure regulating valve 52, as the control valve of the second hydraulic motor unit 6', is therefore, because of the set pressure regulating valve spring 27', in its first final position, in which the set pressure chamber 62 of the adjustment device 54 of the variation device 31' of the second hydraulic motor unit 6' is connected to the tank volume 11 via a set pressure joining duct 66 and a tank duct 68. The second hydraulic motor unit 6' is thus adjusted in the direction of a large pivoting angle.

Similarly to the example from FIG. 1, in a first switch position of the control valve 32' the hydraulic motor unit 5' is adjusted so that a smaller torque acts on the first driven shaft 20, which in turn corresponds to the front axle of the vehicle, than on the second drive shaft 21. If the driving lever 37 is now moved from the position for forward motion F into a position for backward motion R, this new position is converted by the electronic device 36 into corresponding control signals for the electromagnets 34, 34'. Current no longer flows through the further electromagnet 34', instead current flows via the signal line 35 through the electromagnet 34, which adjusts the control valve 32' in the direction of its second switch position. In the second switch position, the removal duct 40 is connected to the second control pressure duct 49, and the first control pressure duct 39 is connected to the relief duct 50. In this way, again similarly to the embodiment from FIG. 1 and the adjustment described above of the hydraulic motor units 5' and 6', the second hydraulic motor unit 6' is adjusted in the direction of smaller absorption volume, and the first hydraulic motor unit 5' is adjusted in the direction of greater absorption volume. The change of the absorption volume of the first hydraulic motor unit 5' and second hydraulic motor unit 6' is again preferably equally great.

Additionally, the control valve 32' can take a third switch position. In the third switch position, both the first control pressure duct 39 and the second control pressure duct 49 are connected to the removal duct 40. To take the third switch position, both electromagnets 34, 34' are controlled correspondingly by the electronic device 36, if it is detected that the operator has specified a high driving speed. Specifying a high driving speed can be detected by the electronic device 36 because the driving lever 37 passes a specified position. The third switch position of the control valve 32' corresponds to a fast gear. In this position, both the first hydraulic motor unit 5' and the second hydraulic motor unit 6' are adjusted in the direction of a smaller pivoting angle. In this way the transmissible torque is reduced, but simultaneously the r.p.m. of the first and second hydraulic motor 55 and 56 for a given delivery volume of the pump 2 is increased, resulting in a higher speed of the driven vehicle.

For both the control valve 32' and the control pressure regulating valve 51 and 52, continuous adjustment between the final positions can be provided, so that the absorption volume of both the first hydraulic motor 55 and the second hydraulic motor 56 is continuously adjustable.

Figure 3:
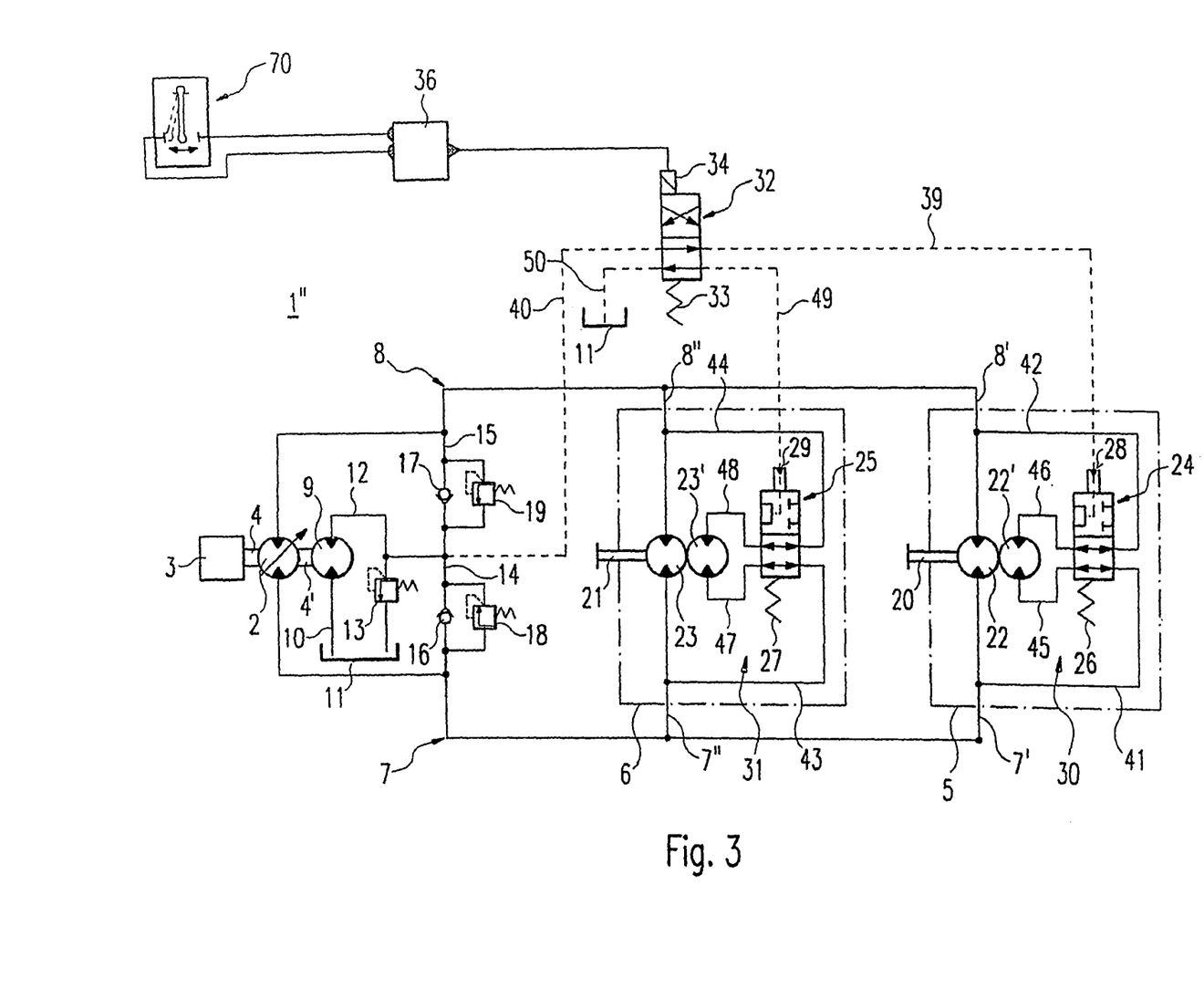
FIG. 3 shows a schematic representation of a hydrostatic traversing mechanism, with a third embodiment of a controller according to the invention.

In FIG. 3, an embodiment of the controller according to the invention, in which instead of the driving lever 37 from FIG. 1 an inclination sensor 70 is provided, is shown. The inclination sensor detects the inclination of the vehicle relative to the level. If the inclination sensor 70 detects that the level of the front axle is above the level of the rear axle, the electronic device 36 does not supply current to the electromagnet 34, and the control valve 32 is in its first switch position, which is fixed by the control valve spring 33. In this switch position of the control valve 32, as was explained in detail about FIG. 1, the first hydraulic motor unit 5 is adjusted in the direction of smaller torque, and thus the torque on the front axle is preventively reduced.

On the other hand, if the vehicle is in a situation in which the level of the rear axle is higher than the level of the front axle, the electronic device 36 switches a current onto the electromagnet 34, which then brings the control valve 32 into its second switch position. In the second switch position, the torque of the second drive shaft 21 is reduced by switching off the second hydraulic motor 23' of the second hydraulic motor unit 6.

The absorption volume of the hydraulic motor units 5 and 6 is adjusted solely on the basis of the detected inclination of the vehicle. In this way, corresponding to the procedure from FIG. 1, before slip occurs on the front or rear axle, the absorption volume of the first hydraulic motor unit 5 and second hydraulic motor unit 6 can be adjusted so that the tendency to form slip is reduced. Use of the inclination sensor 70 makes it possible to apply a smaller torque to the up-side axle. By preventive adjustment of the absorption volume of the first hydraulic motor unit 5 and second hydraulic motor unit 6, because of a simple signal of the inclination sensor 70 a distribution, which is adapted to the driving situation, of the torque on the first driven shaft 20 and second driven shaft 21 is made possible.

In FIG. 3, an inclination sensor 70, which has only two switch positions for the two different inclination directions, a so-called inclination sensor, is enough. However, use of the gradient sensor 70 is not restricted to the embodiment according to FIG. 3, but can also, in combination with the variable adjustment possibility of FIG. 2, make it possible to adapt the torque distribution to the relevant gradient. For this purpose, an inclination sensor 70 which outputs a continuous signal depending on the inclination is provided.

Figure 4:
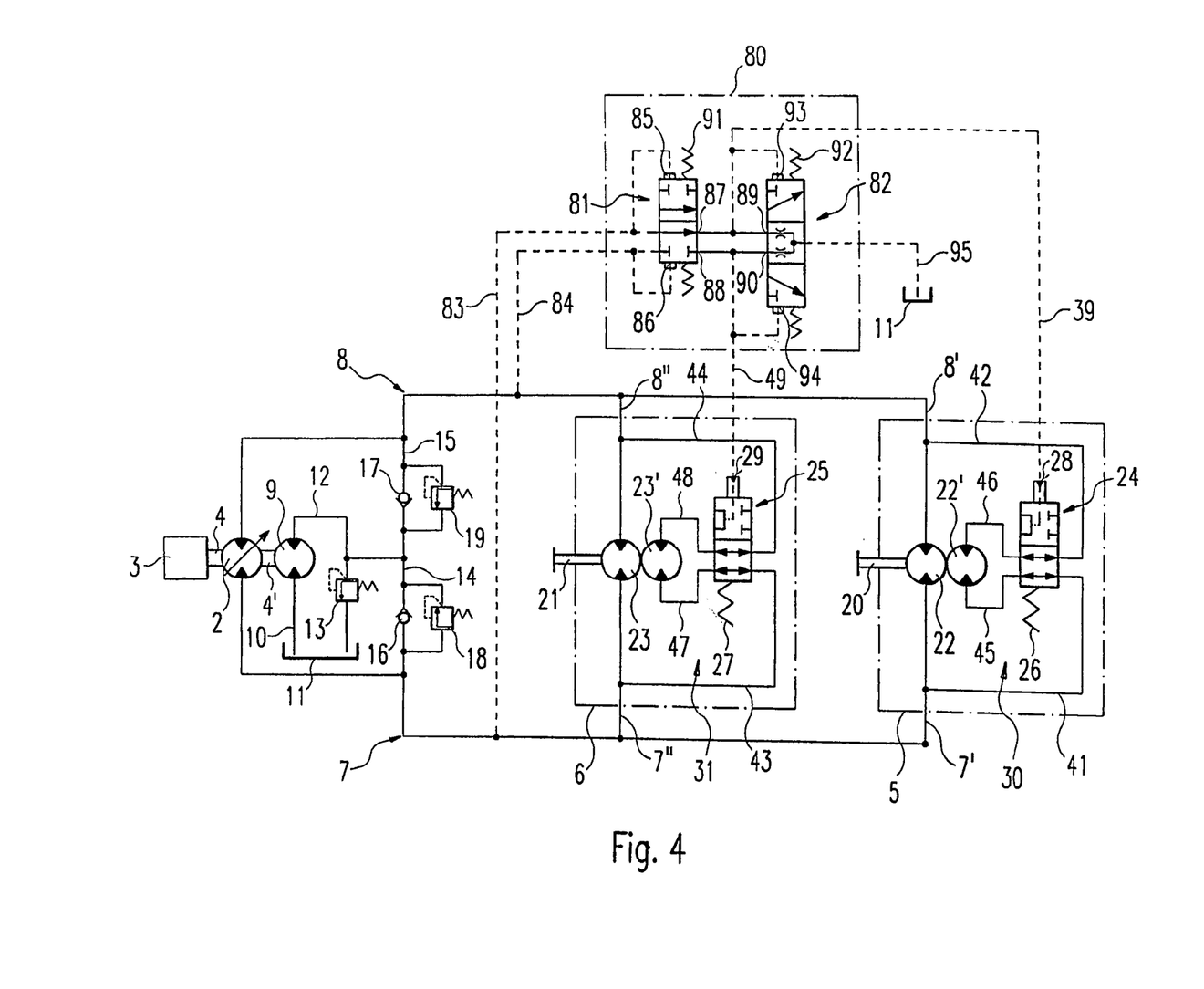
FIG. 4 shows a schematic representation of a hydrostatic traversing mechanism, with a fourth embodiment of a controller according to the invention.

In FIG. 4, a further example of a controller according to the invention is shown. In this, instead of direction of motion or gradient signal, the ratio of the pressure in the first main duct 7 and second main duct 8 is used for control. The first hydraulic motor unit 5 and second hydraulic motor unit 6 are identical with those from FIG. 1, and were explained in detail there. In this embodiment, pressure is applied to the first control pressure duct 39 and second control pressure duct 49, or they are connected to the tank volume 11, by a control valve unit 80 instead of the control valve 32.

The control valve unit 80 comprises a selection valve 81 and a relief valve 82. On the input side, the selection valve 81 is connected via a first main duct branch 83 to the first main duct 7, and via a second main duct branch 84 to the second main duct 8. The first main duct branch 83 is also connected to a first measurement surface 85, through which a force is applied to the selection valve 81, counteracting a hydraulic force which acts on a second measurement surface 86. To generate a hydraulic force on the second measurement surface 86, the second measurement surface 86 is connected to the second main duct branch 84. Additionally, on the selection valve 81, selection valve springs 91 are provided. One selection valve spring in each case exerts a force on the selection valve 81 in the direction of the first and second measurement surface 85 and 86. If the pump 2, for instance, in the case of the forward motion described with reference to FIG. 1, delivers into the second main duct 8, the pressure in the second main duct 8 exceeds the pressure in the first main duct 7. Correspondingly, a greater pressure is delivered via the second main duct branch 84 to the second measurement surface 86 than to the first measurement surface 85. With such a pressure gradient, the selection valve 81 is in its first switch position, shown in FIG. 4. In this first switch position of the selection valve 81, a connection is made between the first main duct branch 83 and a first output 87 of the selection valve 81. On the other hand, the connection between the second main duct branch 84 and the second output 88 of the selection valve 81 remains interrupted.

The relief valve 82 has a first input 89 and a second input 90. The first input 89 is connected to the first output 87 of the selection valve 81, and the second input 90 is connected to the second output 88 of the selection valve 81. Also, the first control pressure duct 39 is connected to the first input 89 of the relief valve 82. The second control pressure duct 49 is connected to the second input 90 of the relief valve 82.

In the described first switch position of the selection valve 81, the first input 89 of the relief valve 82 and thus also the first control pressure duct 39 are connected to the first main duct branch 83. A third measurement surface 93, through which a hydraulic force which is directed oppositely to a hydraulic force which acts on a fourth measurement surface 94 is applied to the relief valve 82, is also connected to the first control pressure duct 39. The fourth measurement surface 94 is connected to the second control pressure duct 49. Because no pressure is applied to the second control pressure duct 49 in the described first switch position of the selection valve 81, the pressure which acts on the third measurement surface 93 brings the relief valve 93 into a first position, in which the second input 90 of the relief valve 82 is connected via a further tank duct 95 to the tank volume 11.

Accordingly, in the first position of the relief valve 82 the second control pressure duct 49 is connected to the tank volume 11, and the first control pressure duct 39 is connected via the first main duct branch 83 to the first main duct 7.

In the case of a pressure reversal in the first main duct 7 and second main duct 8, the selection valve 81 is brought into a second switch position, in which the second main duct branch 84 is connected to the second output 88, so that a control pressure is applied via the second control pressure duct 49 to the control surface 29 of the control valve 25 of the second hydraulic motor unit 6. The control pressure is therefore the pressure of the main duct 7 or 8 which is lower, but is still clearly above the pressure level of the tank volume 11. By connecting the second output 88 to the second main duct branch 84, a hydraulic force is applied to the fourth measurement surface 94, and brings the relief valve 82 into its second position. In the second position, the first input 89 is connected via the further tank duct 95 to the tank volume 11, so that the control surface 28 of the control valve 24 of the first hydraulic motor unit 5 is relieved.

The adjustment of the hydraulic motors on the basis of the pressures on the control surfaces corresponds to the explanations of FIG. 1.

The selection valve 81, and consequently the relief valve 82, are switched solely on the basis of the sign of the pressure difference between the first main duct 7 and the second main duct 8. This means that even without the occurrence of slip during motion on the level, the change of direction of motion, through a corresponding pressure change in the first and second main duct 7 and 8, results in an adaptation of the distribution of the torques. Since the sign of the pressure difference is used exclusively, a pressure reversal is also detected if it is caused, for instance, by downhill motion. The control valve unit 80, irrespective of the direction of motion of the vehicle, adjusts the hydraulic motor unit which is oriented to the up-side to a smaller absorption volume.

To reduce the length of the required joining ducts, it is also possible to integrate a control valve unit 80 in each of the two hydraulic motor units 5, 6. The pressures, which are required for control, of the first main duct 7 and second main duct 8 are present there in any case.

Figure 5:
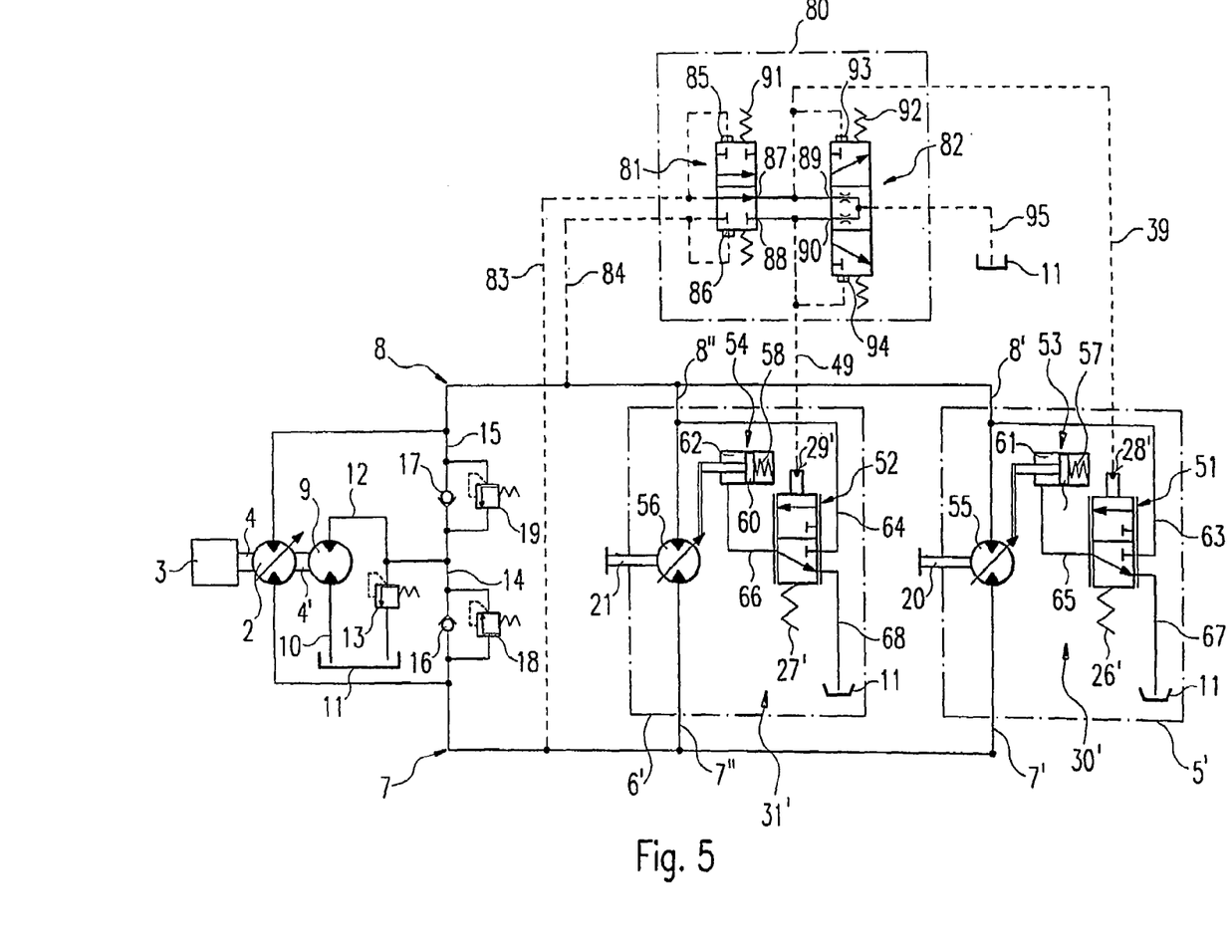
FIG. 5 shows a schematic representation of a hydrostatic traversing mechanism, with a fifth embodiment of a controller according to the invention.

In FIG. 5, a combination of the control valve unit 80 from FIG. 4 with the adjustable hydraulic motor units 5' and 6' from FIG. 2 is shown. In this embodiment, all the valves which are used can be adjusted continuously between their final positions.

Figure 6:
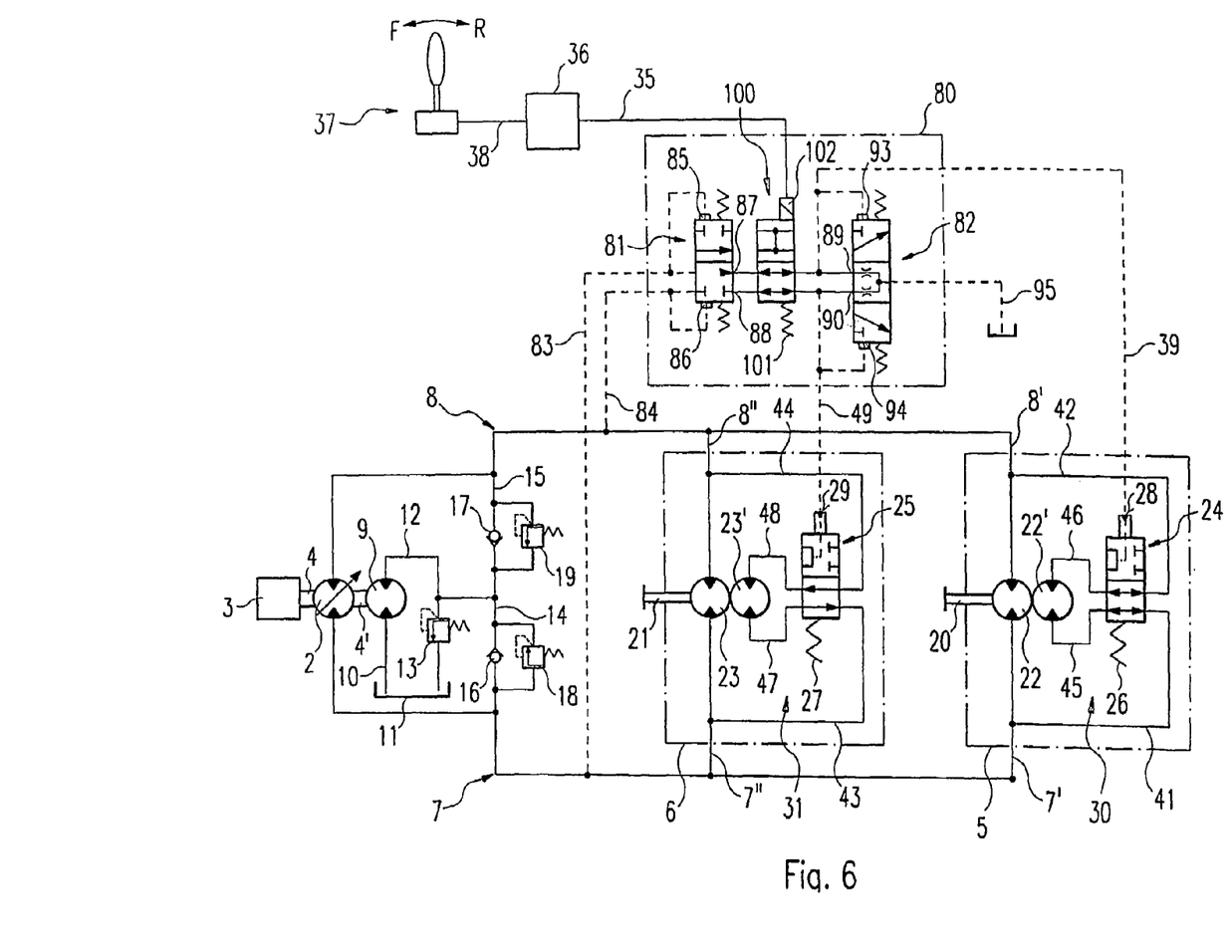
FIG. 6 shows a schematic representation of a hydrostatic traversing mechanism, with a sixth embodiment of a controller according to the invention.

In FIG. 6, an extension of the controller according to the invention from FIG. 4 is shown. As an extension, between the selection valve 81 and the relief valve 82 an over-control valve 100, which in an idle position defined by an over-control valve spring 101 connects the first output 87 of the selection valve 81 to the first input 89 and the second output 88 of the selection valve 81 to the second input 90 of the relief valve 82, is shown.

The over-control valve 100 can be brought into an over-control position, in which additionally the first input 89 and the second input 90 of the relief valve 82 are connected to each other, by an over-control magnet 102. In this way, the lower pressure of the main ducts 7 or 8 is applied to both the first control pressure duct 39 and the second control pressure duct 49, and thus both the first hydraulic motor unit 5 and the second hydraulic motor unit 6 are adjusted for smaller absorption volume. With constant delivery volume of the pump 2, the result is a lower torque with simultaneously increased driving speed.

Because of the pressure which is equally present on the third and fourth measurement surface, the relief valve takes a central, third position. The first input 89 and second input 90 are connected to the tank volume 11 via the tank duct 95. The connection takes place choked. The connection enables a small quantity of oil from the low-pressure-side first or second main duct 7 or 8 to enter the tank volume 11, thus achieving additional cooling.

Figure 7:
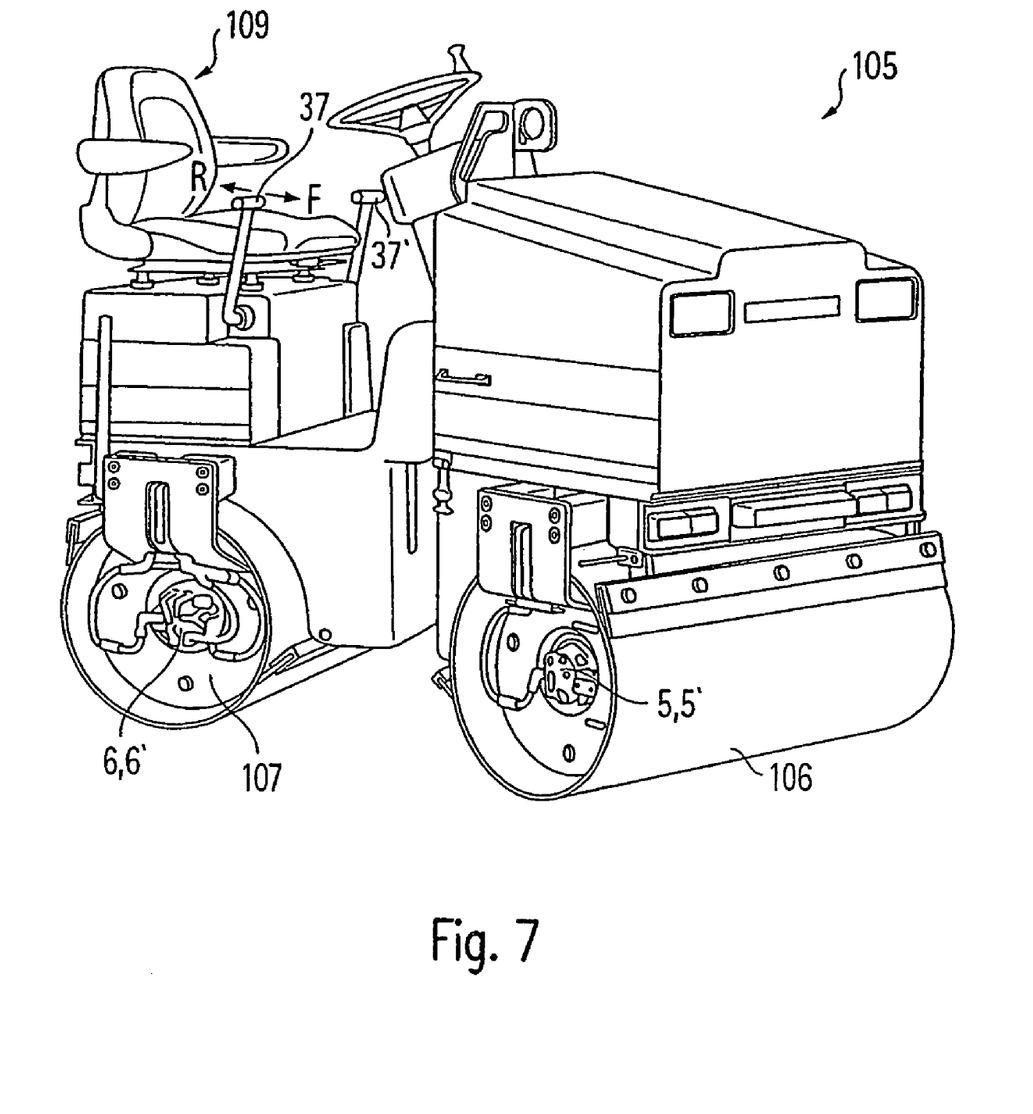
FIG. 7 shows an example of a vehicle, with a hydrostatic traversing mechanism which is equipped with the controller according to the invention.

In FIG. 7, an example of a vehicle which is equipped with a controller according to the invention is shown. The vehicle 105 is a road roller with a front roller 106 and a rear roller 107. The front roller is driven by the first hydraulic motor unit 5 or 5' and the rear roller 107 is driven by the second hydraulic motor unit 6 or 6'. To specify the direction and speed of motion, the driving lever 37 is provided. To simplify operation during work, a second driving lever 37' is provided, so that a driving lever is available to the operator on both sides of a driver's seat 109.

The invention claimed is:

1. A controller for a hydrostatic traversing mechanism with at least one hydraulic pump, which is connected via a first and a second main duct to a first hydraulic motor unit which drives a front axle and a second hydraulic motor unit which drives a rear axle, an absorption volume of the first and the second hydraulic motor unit being adjustable via a first and a second variation device respectively, and a direction of motion being specified as a forward motion (F) or backward motion (R) by a position of driving lever, wherein the first and second variation device are controlled by a control valve, the control valve taking a first switch position in the case of forward motion (F) being defined by the position of the driving lever and a second switch position in the case of backward motion (R) being defined by the position of the driving lever, in the first switch position the first variation device being controlled so that the first hydraulic motor unit is adjusted in the direction of a smaller absorption volume, and in the second position the second variation device being controlled so that the second hydraulic motor unit is adjusted in the direction of a smaller absorption volume.

2. A controller for a hydrostatic traversing mechanism with at least one hydraulic pump, which is connected via a first and a second main duct to a first hydraulic motor unit which drives a front axle and a second hydraulic motor unit which drives a rear axle, an absorption volume of the first and the second hydraulic motor unit being adjustable via a first and a second variation device respectively, and with an inclination as uphill inclination or downhill inclination, wherein the first and second variation device are controlled by a control valve, the control valve—taking a first switch position in the case of downhill inclination, in the first switch position the first variation device being controlled so that the first hydraulic motor unit is adjusted in the direction of a smaller absorption volume, and in the second position the second variation device being controlled so that the second hydraulic motor unit is adjusted in the direction of a smaller absorption volume.

3. The controller according to claim 1 or 2, wherein in the first switch position of the control valve a control pressure is applied to a control surface of a control valve of the first variation device, and a control surface of a control valve of the second variation device is connected to a tank volume, and in the second switch position of the control valve the control surface of the control valve of the first variation device is connected to the tank volume, and the control pressure is applied to the control surface of the control valve of the second variation device.

4. The controller according to claim 1 or 2, wherein the control pressure is generated by an auxiliary pump.

5. The controller according to claim 1 or 2, wherein the control valve is a 4/2-way valve.

6. The controller according to claim 1 or 2, wherein the control valve is a 4/3-way valve.

7. The controller according to claim 6, wherein in a third switch position, the control surfaces of the control valves of the first and second variation device are connected to the tank volume.

8. The controller according claim 1 or 2, wherein the control valve is actuated electromagnetically.

9. The controller according to claim 1 or 2, wherein the first and second hydraulic motor unit each include at least two hydraulic motors, of which at least one can be switched on and off to change the absorption volume of the hydraulic motor unit.

10. The controller according to claim 1 or 2, wherein the first and second hydraulic motor unit each include an adjustment motor.

11. The controller according to claim 10, wherein the control valve is continuously adjustable between the first and second switch position.

12. The controller according to claim 11, wherein the control valves are continuously adjustable between two final positions.

13. A controller for a hydrostatic traversing mechanism with at least one hydraulic pump, which is connected via a first and a second main duct to a first hydraulic motor unit which drives a front axle and a second hydraulic motor unit which drives a rear axle, an absorption volume of the first and the second hydraulic motor unit being adjustable via a first and a second variation device, wherein the first and second variation device are controlled by a control valve unit, the control valve unit taking a first or second switch position depending on the sign of the pressure difference between the first and second main duct, and in the first switch position the first variation device being controlled so that the first hydraulic motor unit is adjusted in the direction of a smaller absorption volume, and in the second position the second variation device being controlled so that the second hydraulic motor unit is adjusted in the direction of a smaller absorption volume.

14. The controller according to claim 13, wherein the control valve unit includes a selection valve and a relief valve, and that in a first switch position of the selection valve a first input of the relief valve is connected to the first main duct, the first or second main duct which is connected to the relief valve being the one with lower pressure.

15. The controller according to claim 14, wherein a control surface of a control valve of the first variation device is connected to the first input of the relief valve, and that a control surface of a control valve of the second variation device is connected to the second input of the relief valve.

16. The controller according to claim 15, wherein the relief valve is switched into a first or second position depending on the pressure which is present at a first or second input, in the first position the second input being connected to a tank volume, and in the second position the first input being connected to the tank volume.

17. The controller according to claim 13, wherein the first and second hydraulic motor unit each include at least two hydraulic motors, of which at least one can be switched on and off to change the absorption volume of the hydraulic motor unit.

18. The controller according to claim 13, wherein the first and second hydraulic motor unit each include an adjustment motor.

19. The controller according to claim 18, wherein the selection valve and relief valve are continuously adjustable between appropriate final positions.

20. The controller according to claim 19, wherein the control valves are continuously adjustable between two final positions.

21. The controller according to claim 13, wherein between the selection valve and the relief valve an over-control valve, which in its idle position connects a first and second output of the selection valve to the first input and second output of the relief valve, and which in an over-control position connects both outputs of the selection valve to both inputs of the relief valve, is provided.

22. The controller according to claim 21, wherein the relief valve is in a third position if the over-control valve is in its over-control position, and in the third position of the relief valve its first and second input are connected to the tank volume.

23. The controller according to one of claim 13, wherein one control valve unit is integrated into each of the first hydraulic motor unit and second hydraulic motor unit.

24. The controller according to claim 1, 2, or 13, wherein the change of the absorption volume of the first and second hydraulic motor unit in the direction of a smaller absorption volume is compensated for by a corresponding change of the absorption volume of the other hydraulic motor unit in the direction of a greater absorption volume.

* * * * *